(12) United States Patent
Baylon et al.

(10) Patent No.: US 12,641,300 B2
(45) Date of Patent: May 26, 2026

(54) SYSTEM AND METHOD FOR DEBLOCKING HDR CONTENT

(71) Applicant: ARRIS Enterprises LLC, Horsham, PA (US)

(72) Inventors: David M. Baylon, San Diego, CA (US); Ajay Luthra, San Diego, CA (US)

(73) Assignee: ARRIS Enterprises LLC, Horsham, PA (US)

( * ) Notice: Subject to any disclaimer, the term of this patent is extended or adjusted under 35 U.S.C. 154(b) by 0 days.

(21) Appl. No.: 19/000,398

(22) Filed: Dec. 23, 2024

(65) Prior Publication Data

US 2025/0240462 A1      Jul. 24, 2025

Related U.S. Application Data

(63) Continuation of application No. 18/597,803, filed on Mar. 6, 2024, now Pat. No. 12,219,179, which is a (Continued)

(51) Int. Cl.
H04N 19/86          (2014.01)
H04N 7/015          (2006.01)
(Continued)

(52) U.S. Cl.
CPC ............. H04N 19/86 (2014.11); H04N 7/015 (2013.01); H04N 19/11 (2014.11);
(Continued)

(58) Field of Classification Search
CPC ........ H04N 19/86; H04N 7/015; H04N 19/11; H04N 19/115; H04N 19/117;
(Continued)

(56) References Cited

U.S. PATENT DOCUMENTS 9,167,269 B2     10/2015  Van der Auwera et al.
9,762,927 B2      9/2017  Chen et al.
(Continued)

FOREIGN PATENT DOCUMENTS

JP         2013-058935 A       3/2013
JP         2014531169 A      11/2014
(Continued)

OTHER PUBLICATIONS

Sakae Okubo, et al., 6.1 Deblocking filter, H. 265/HEVC Textbook, Impress Japan Co., Ltd., Oct. 21, 2013, 1st edition, pp. 114, 150-157.

(Continued)

*Primary Examiner* — Susan E. Hodges
(74) *Attorney, Agent, or Firm* — Chernoff, Vilhauer, McClung & Stenzel, LLP

(57)          ABSTRACT

A system and method for coding video in which deblocking artifacts are reduced by using modified filtering that is based, at least in part on pixel intensity associated with a coding unit, such that filtering levels are increased as pixel intensity increases. In some embodiments, an offset value or indicator of an offset value for parameters associated with deblocking filter parameters can be associated with a filtering level that is based at least in part on an intensity value.

2 Claims, 12 Drawing Sheets

Related U.S. Application Data continuation of application No. 18/099,003, filed on Jan. 19, 2023, now Pat. No. 11,956,477, which is a continuation of application No. 17/684,312, filed on Mar. 1, 2022, now Pat. No. 11,595,698, which is a continuation of application No. 16/370,140, filed on Mar. 29, 2019, now Pat. No. 11,297,351.

(60) Provisional application No. 62/650,252, filed on Mar. 29, 2018.

(51) Int. Cl.

| | |
|---|---|
| *H04N 19/11* | (2014.01) |
| *H04N 19/115* | (2014.01) |
| *H04N 19/117* | (2014.01) |
| *H04N 19/119* | (2014.01) |
| *H04N 19/13* | (2014.01) |
| *H04N 19/139* | (2014.01) |
| *H04N 19/176* | (2014.01) |
| *H04N 19/18* | (2014.01) |
| *H04N 19/186* | (2014.01) |
| *H04N 19/61* | (2014.01) |
| *H04N 19/625* | (2014.01) |
| *H04N 19/82* | (2014.01) |
| *H04N 19/96* | (2014.01) |

(52) U.S. Cl.
CPC ......... *H04N 19/115* (2014.11); *H04N 19/117* (2014.11); *H04N 19/119* (2014.11); *H04N 19/13* (2014.11); *H04N 19/139* (2014.11); *H04N 19/176* (2014.11); *H04N 19/18* (2014.11); *H04N 19/186* (2014.11); *H04N 19/61* (2014.11); *H04N 19/625* (2014.11); *H04N 19/82* (2014.11); *H04N 19/96* (2014.11)

(58) Field of Classification Search
CPC .... H04N 19/119; H04N 19/13; H04N 19/139; H04N 19/176; H04N 19/18; H04N 19/186; H04N 19/61; H04N 19/625; H04N 19/82; H04N 19/96
USPC ........................................................ 375/240
See application file for complete search history.

(56) References Cited

U.S. PATENT DOCUMENTS

| | | |
|---|---|---|
| 2014/0204999 A1 | 7/2014 | Park et al. |
| 2014/0233659 A1 | 8/2014 | Narroschke et al. |
| 2018/0352264 A1 | 12/2018 | Guo et al. |
| 2019/0281295 A1 | 9/2019 | Ichigaya et al. |
| 2019/0327476 A1 | 10/2019 | Lee et al. |

FOREIGN PATENT DOCUMENTS

| | | |
|---|---|---|
| JP | 2017163617 A | 9/2017 |
| KR | 10-2004-0106437 A | 12/2004 |
| KR | 10-2014-0085545 A | 7/2014 |
| WO | 2018097299 A1 | 10/2019 |

OTHER PUBLICATIONS

Xiang Li, et al., Multi-Type-Tree, Joint Video Exploration Team (JVET) of ITU-T SG 16 WP 3 and ISO/IEC JTC 1/SC 29/WG 11 4th Meeting: Chengdu, CN, Oct. 15-21, 2016, [JVET-D0117r1], Oct. 20, 2016, pp. 1-3, Internet <URL: http://phenix.it-sudparis.eu/jvet/doc_end_user/documents/4_Chengdu/wg11/JVET-D0117-v3.zip> <JVET-D0117_r1.doc>.

Office Action in Japanese Patent Application No. JP2020-552786 dated Mar. 1, 2023.

Gomila, "Simplification of JVT deblocking filter", 3rd JVT meeting; 60th MPEG Meeting, Fairfax, No. JVT-C130rl-L, May 10, 2002. (Year:2002).

A. Norkin, G. Bjontegaard, A. Fuldseth, M. Narroschke, M. Ikeda, K. Andersson, M. Zhou, and G. Van der Auwera, HEVC Deblocking Filter, IEEE Trans. Circuits Syst. Video Technol., vol. 22, No. 12, pp. 1746-1754, Dec. 2012.

High Efficiency Video Coding, "Series H: Audiovisual and Multimedia Systems Infrastructure of audiovisual services—Coding of moving video", Telecommunication Standardization Sector, ITU-T H.265, Dec. 2016.

S. Iwamura, et al., "Description of SDR and HDR video coding technology proposal by NHK and Sharp", 10th JVET Meeting, Sand Diego, No. JVET-J0027,. Apr. 2, 2018, pp. 1-40.

PCT International Search Report & Written Opinion, Re: Application No. PCT/US2019/024936, dated Aug. 1, 2019.

Office Action in Korean Patent Application No. KR 10-2020-7031293 dated Jun. 1, 2024.

Hyeongmoon Jang, Junghak Nam, Jaehyun Lim, Parallel deblocking filter for QTBT, Joint Video Exploration Team (JVET) of ITU-T SG 16 WP 3 and ISO/IEC JTC 1/SC 29/WG11 4th Meeting: Chengdu, Version4,ITU-T <URL:http://phenix.it-sudparis.eu/jvet/doc_end_user/documents/4_Chengdu/wg11/JVET-D0044-v4.zip>, Oct. 16, 2016, p. 1-4.

Office Action in Japanese Patent Application No. 2023-111838, dated Aug. 6, 2024.

700

1300

SYSTEM AND METHOD FOR DEBLOCKING HDR CONTENT

CLAIM OF PRIORITY

This application is a continuation of U.S. patent application Ser. No. 18/597,803, filed Mar. 6, 2024, which is a continuation of U.S. patent application Ser. No. 18/099,003, filed Jan. 19, 2023, now U.S. Pat. No. 11,956,477, which is a continuation of U.S. patent application Ser. No. 17/684, 312, filed Mar. 1, 2022, now U.S. Pat. No. 11,595,698, which is a continuation of U.S. patent application Ser. No. 16/370,140, filed Mar. 29, 2019, now U.S. Pat. No. 11,297, 351, which claims priority under 35 U.S.C. § 119(e) from earlier filed U.S. Provisional Application Ser. No. 62/650, 252, filed Mar. 29, 2018 the entirety of which are hereby incorporated herein by reference.

TECHNICAL FIELD

The present disclosure relates to the field of video coding, particularly systems and methods for efficiently and effectively deblocking and filtering HDR content.

BACKGROUND

The technical improvements in evolving video coding standards illustrate the trend of increasing coding efficiency to enable higher bit-rates, higher resolutions, and better video quality. The Joint Video Exploration Team developed a new video coding scheme referred to as JVET and is developing a newer video coding scheme referred to a Versatile Video Coding (VVC)—the complete contents of the VVC 7th edition of draft 2 of the standard titled Versatile Video Coding (Draft 2) by JVET published Oct. 1, 2018 is hereby incorporated herein by reference. Similar to other video coding schemes like HEVC (High Efficiency Video Coding), both JVET and VVC are block-based hybrid spatial and temporal predictive coding schemes. However, relative to HEVC, JVET and VVC include many modifications to bitstream structure, syntax, constraints, and mapping for the generation of decoded pictures. JVET has been implemented in Joint Exploration Model (JEM) encoders and decoders, but VVC is not anticipated to be implemented until early 2020.

Current video coding schemes implement deblocking and filtering without taking image intensity into account and consequently implement filtering of content in a uniform manner across all content. However, the data reveal that the intensity of the content can impact the degree or level of filtering that is desired or necessary in order to reduce display issues. Accordingly, what is needed is a system and method of deblocking based at least in part on pixel intensity of coding units.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. General aspects of such comprise determining a coding unit, determining intensity information of pixels associated with a boundary of said coding unit, applying deblocking filtering to said coding unit prior to encoding, based at least in part on intensity information associated with said coding unit and encoding said coding unit for transmission. Other embodiments of this aspect include corresponding computer systems, apparatus, and computer programs recorded on one or more computer storage devices, each configured to perform the actions of the methods.

Implementations can also comprise one or more of the following features: The method of encoding video wherein stronger deblocking filtering is applied to coding units associated with intensity information having a value greater than a threshold value. The method of encoding video wherein said threshold value is a predetermined value. The method of encoding video further comprising identifying a neighboring coding unit adjacent to said coding unit, determining intensity information for pixels associated with a boundary of said neighboring coding unit, and comparing said intensity information of pixels associated with a boundary of said coding unit and said intensity information of pixels associated with said neighboring coding unit, where said filtering is based at least in part on said comparison of said intensity information of pixels associated with a boundary of said coding unit and said intensity information of pixels associated with said neighboring coding unit. The method of encoding video wherein stronger deblocking filtering is applied to coding units associated with intensity information having a value greater than a threshold value. The method of encoding video wherein said threshold value is a predetermined value. Implementations of the described techniques may include hardware, a method or process, or computer software on a computer-accessible medium.

One general aspect can include a method of decoding video comprising: receiving a bitstream of encoded video; decoding said bitstream; determining a coding unit; determining intensity information of pixels associated with a boundary of said coding unit; applying deblocking filtering to said coding unit prior to encoding, based at least in part on intensity information associated with said coding unit; and encoding said coding unit for transmission. Other embodiments of this aspect include corresponding computer systems, apparatus, and computer programs recorded on one or more computer storage devices, each configured to perform the actions of the methods.

Implementations can also comprise the same or similar features for the decoding process. Moreover, implementations of the described techniques may include hardware, a method or process, or computer software on a computer-accessible medium.

BRIEF DESCRIPTION OF THE DRAWINGS

Further details of the present invention are explained with the help of the attached drawings in which.

DETAILED DESCRIPTION

Figure 1:
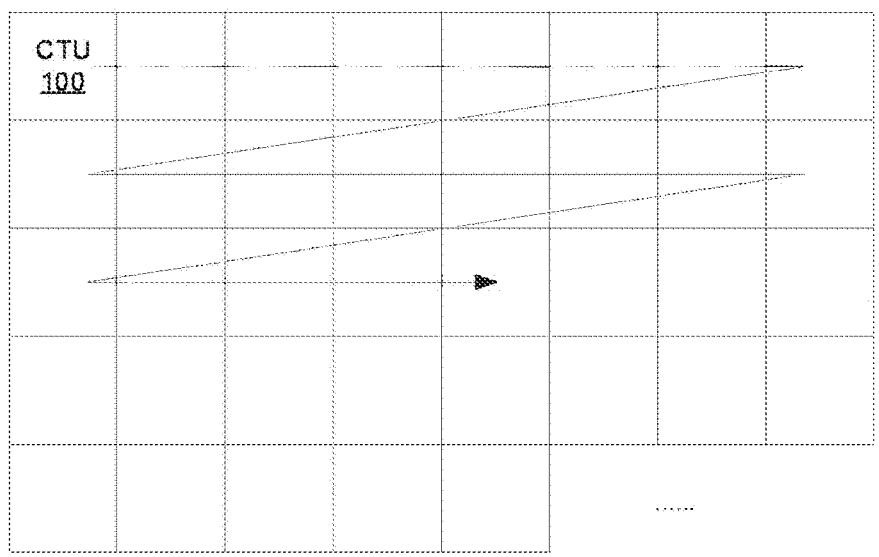
FIG. 1 depicts division of a frame into a plurality of Coding Tree Units (CTUs).

FIG. 1 depicts division of a frame into a plurality of Coding Tree Units (CTUs) 100. A frame can be an image in a video sequence. A frame can include a matrix, or set of matrices, with pixel values representing intensity measures in the image. Thus, a set of these matrices can generate a video sequence. Pixel values can be defined to represent color and brightness in full color video coding, where pixels are divided into three channels. For example, in a YCbCr color space pixels can have a luma value, Y, that represents gray level intensity in the image, and two chrominance values, Cb and Cr, that represent the extent to which color differs from gray to blue and red. In other embodiments, pixel values can be represented with values in different color spaces or models. The resolution of the video can determine the number of pixels in a frame. A higher resolution can mean more pixels and a better definition of the image, but can also lead to higher bandwidth, storage, and transmission requirements.

Frames of a video sequence can be encoded and decoded using JVET. JVET is a video coding scheme being developed by the Joint Video Exploration Team. Versions of JVET have been implemented in JEM (Joint Exploration Model) encoders and decoders. Similar to other video coding schemes like HEVC (High Efficiency Video Coding), JVET is a block-based hybrid spatial and temporal predictive coding scheme. During coding with JVET, a frame is first divided into square blocks called CTUs 100, as shown in FIG. 1. For example, CTUs 100 can be blocks of 128×128 pixels.

Figure 2A:
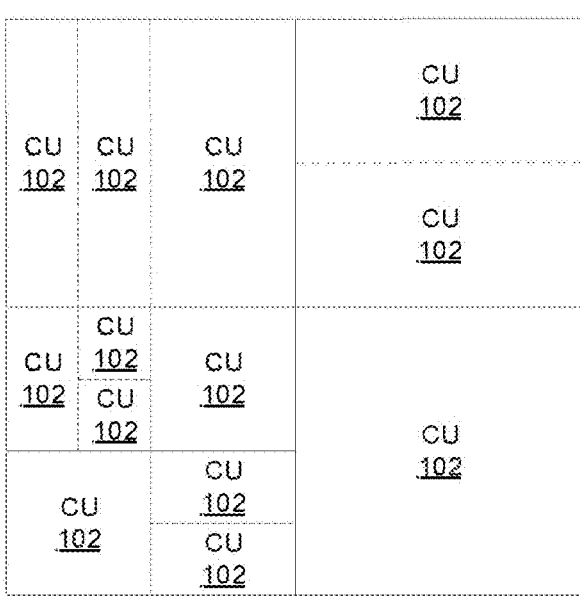
FIG. 2a-2c depict exemplary partitioning of a CTU into Coding Units (CUs).

FIG. 2a depicts an exemplary partitioning of a CTU 100 into CUs 102. Each CTU 100 in a frame can be partitioned into one or more CUs (Coding Units) 102. CUs 102 can be used for prediction and transform as described below. Unlike HEVC, in JVET the CUs 102 can be rectangular or square and can be coded without further partitioning into prediction units or transform units. The CUs 102 can be as large as their root CTUs 100, or be smaller subdivisions of a root CTU 100 as small as 4×4 blocks.

In JVET, a CTU 100 can be partitioned into CUs 102 according to a quadtree plus binary tree (QTBT) scheme in which the CTU 100 can be recursively split into square blocks according to a quadtree, and those square blocks can then be recursively split horizontally or vertically according to binary trees. Parameters can be set to control splitting according to the QTBT, such as the CTU size, the minimum sizes for the quadtree and binary tree leaf nodes, the maximum size for the binary tree root node, and the maximum depth for the binary trees. In VVC, a CTU 100 can be portioned into CUs utilizing ternary splitting also.

Figure 2B:
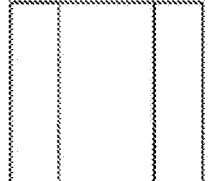
Figure 2C:
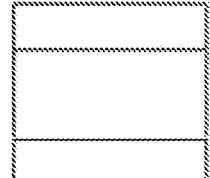

By way of a non-limiting example, FIG. 2a shows a CTU 100 partitioned into CUs 102, with solid lines indicating quadtree splitting and dashed lines indicating binary tree splitting. As illustrated, the binary splitting allows horizontal splitting and vertical splitting to define the structure of the CTU and its subdivision into CUs. FIGS. 2b & 2c depict alternate, non-limiting examples of ternary splitting of a CU wherein subdivisions of the CUs are nonequal.

Figure 3:
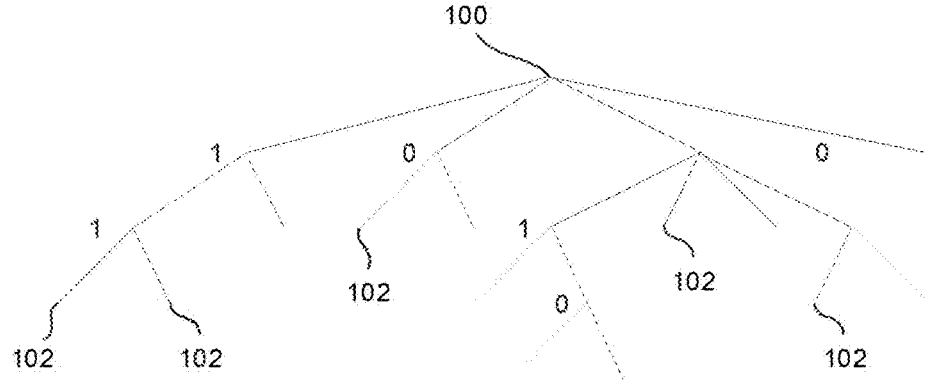
FIG. 3 depicts a quadtree plus binary tree (QTBT) representation of FIG. 2's CU partitioning.

FIG. 3 depicts a QTBT representation of FIG. 2's partitioning. A quadtree root node represents the CTU 100, with each child node in the quadtree portion representing one of four square blocks split from a parent square block. The square blocks represented by the quadtree leaf nodes can then be divided zero or more times using binary trees, with the quadtree leaf nodes being root nodes of the binary trees. At each level of the binary tree portion, a block can be divided either vertically or horizontally. A flag set to "0" indicates that the block is split horizontally, while a flag set to "1" indicates that the block is split vertically.

After quadtree splitting and binary tree splitting, the blocks represented by the QTBT's leaf nodes represent the final CUs 102 to be coded, such as coding using inter prediction or intra prediction. For slices or full frames coded with inter prediction, different partitioning structures can be used for luma and chroma components. For example, for an inter slice a CU 102 can have Coding Blocks (CBs) for different color components, such as such as one luma CB and two chroma CBs. For slices or full frames coded with intra prediction, the partitioning structure can be the same for luma and chroma components.

Figure 4:
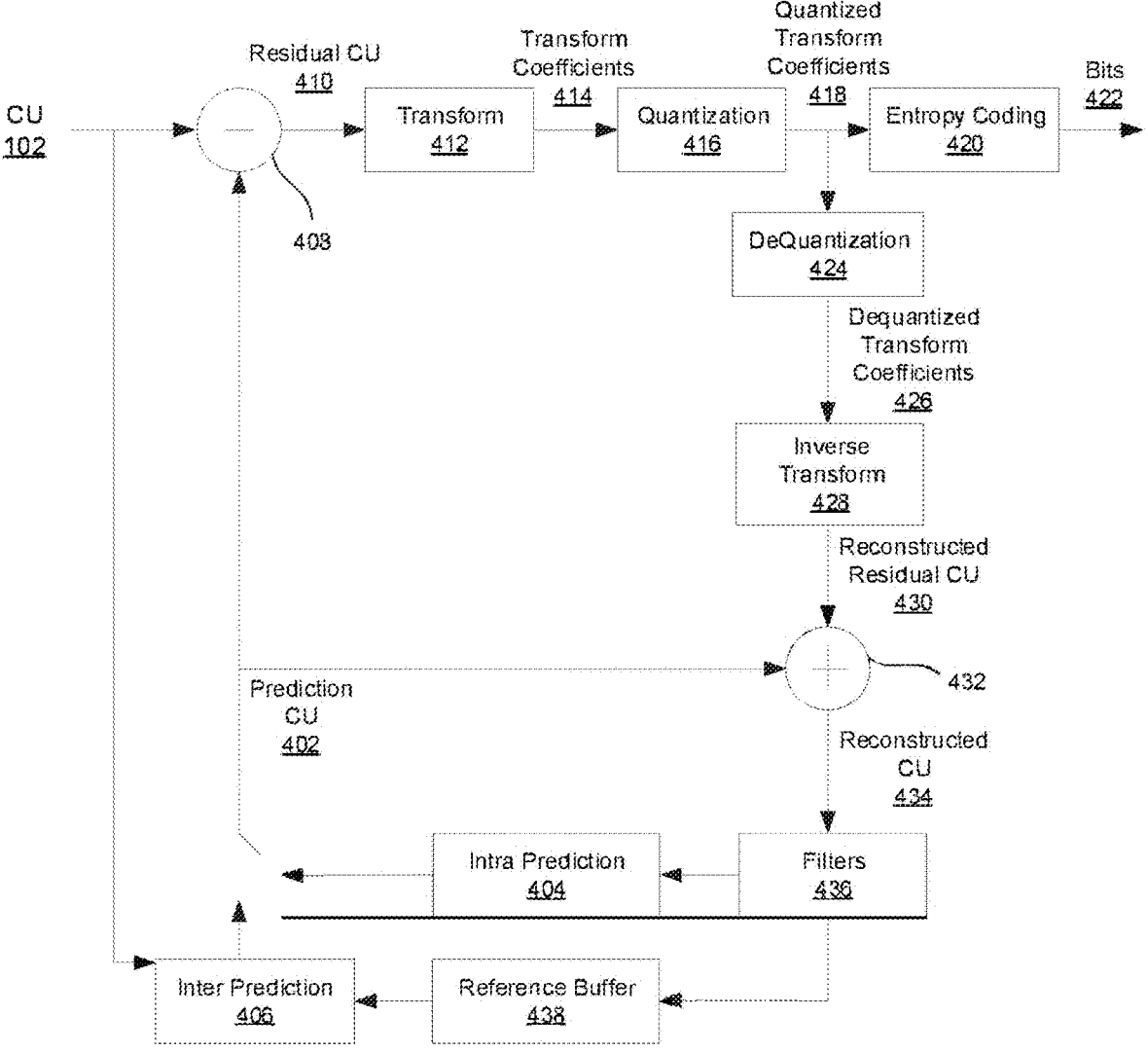
FIG. 4 depicts a simplified block diagram for CU coding in a JVET or VVC encoder.

FIG. 4 depicts a simplified block diagram for CU coding in a JVET encoder. The main stages of video coding include partitioning to identify CUs 102 as described above, followed by encoding CUs 102 using prediction at 404 or 406, generation of a residual CU 410 at 408, transformation at 412, quantization at 416, and entropy coding at 420. The encoder and encoding process illustrated in FIG. 4 also includes a decoding process that is described in more detail below.

Given a current CU 102, the encoder can obtain a prediction CU 402 either spatially using intra prediction at 404 or temporally using inter prediction at 406. The basic idea of prediction coding is to transmit a differential, or residual, signal between the original signal and a prediction for the original signal. At the receiver side, the original signal can be reconstructed by adding the residual and the prediction, as will be described below. Because the differential signal has a lower correlation than the original signal, fewer bits are needed for its transmission.

A slice, such as an entire picture or a portion of a picture, coded entirely with intrapredicted CUs can be an I slice that can be decoded without reference to other slices, and as such can be a possible point where decoding can begin. A slice coded with at least some interpredicted CUs can be a predictive (P) or bi-predictive (B) slice that can be decoded based on one or more reference pictures. P slices may use intra-prediction and inter-prediction with previously coded slices. For example, P slices may be compressed further than the I-slices by the use of inter-prediction, but need the coding of a previously coded slice to code them. B slices can use data from previous and/or subsequent slices for its coding, using intra-prediction or interprediction using an interpolated prediction from two different frames, thus increasing the accuracy of the motion estimation process. In some cases P slices and B slices can also or alternately be encoded using intra block copy, in which data from other portions of the same slice is used.

As will be discussed below, intra prediction or inter prediction can be performed based on reconstructed CUs 434 from previously coded CUs 102, such as neighboring CUs 102 or CUs 102 in reference pictures.

When a CU 102 is coded spatially with intra prediction at 404, an intra prediction mode can be found that best predicts pixel values of the CU 102 based on samples from neighboring CUs 102 in the picture.

Figure 5:
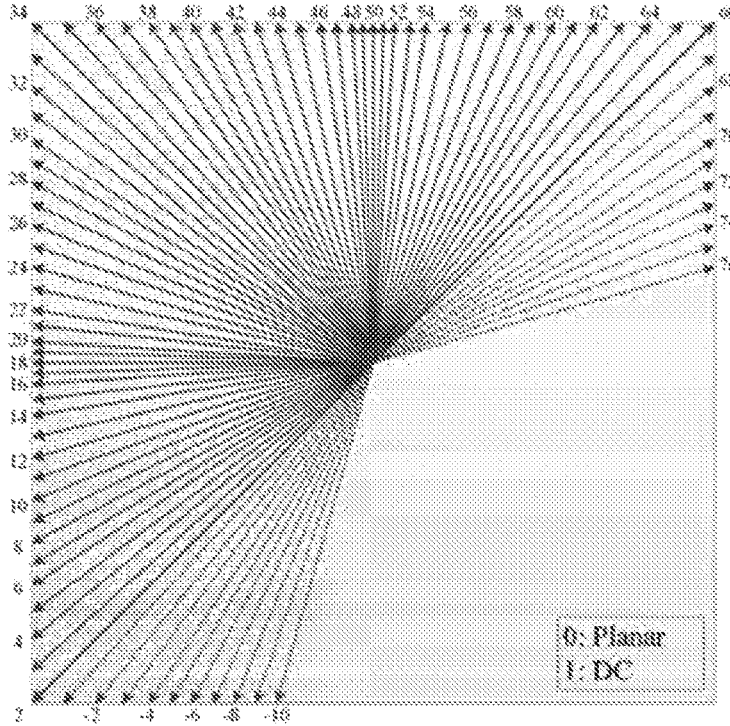
FIG. 5 depicts possible intra prediction modes for luma components in JVET of VVC.

When coding a CU's luma component, the encoder can generate a list of candidate intra prediction modes. While HEVC had 35 possible intra prediction modes for luma components, in JVET there are 67 possible intra prediction modes for luma components and in VVC there are 85 prediction modes. These include a planar mode that uses a three dimensional plane of values generated from neighboring pixels, a DC mode that uses values averaged from neighboring pixels, the 65 directional modes shown in FIG. 5 that use values copied from neighboring pixels along the solid-line indicated directions and 18 wide-angle prediction modes that can be used with non-square blocks.

When generating a list of candidate intra prediction modes for a CU's luma component, the number of candidate modes on the list can depend on the CU's size. The candidate list can include: a subset of HEVC's 35 modes with the lowest SATD (Sum of Absolute Transform Difference) costs; new directional modes added for JVET that neighbor the candidates found from the HEVC modes; and modes from a set of six most probable modes (MPMs) for the CU 102 that are identified based on intra prediction modes used for previously coded neighboring blocks as well as a list of default modes.

When coding a CU's chroma components, a list of candidate intra prediction modes can also be generated. The list of candidate modes can include modes generated with cross-component linear model projection from luma samples, intra prediction modes found for luma CBs in particular collocated positions in the chroma block, and chroma prediction modes previously found for neighboring blocks. The encoder can find the candidate modes on the lists with the lowest rate distortion costs, and use those intra prediction modes when coding the CU's luma and chroma components. Syntax can be coded in the bitstream that indicates the intra prediction modes used to code each CU 102.

After the best intra prediction modes for a CU 102 have been selected, the encoder can generate a prediction CU 402 using those modes. When the selected modes are directional modes, a 4-tap filter can be used to improve the directional accuracy. Columns or rows at the top or left side of the prediction block can be adjusted with boundary prediction filters, such as 2-tap or 3-tap filters.

The prediction CU 402 can be smoothed further with a position dependent intra prediction combination (PDPC) process that adjusts a prediction CU 402 generated based on filtered samples of neighboring blocks using unfiltered samples of neighboring blocks, or adaptive reference sample smoothing using 3-tap or 5-tap low pass filters to process reference samples.

When a CU 102 is coded temporally with inter prediction at 406, a set of motion vectors (MVs) can be found that points to samples in reference pictures that best predict pixel values of the CU 102. Inter prediction exploits temporal redundancy between slices by representing a displacement of a block of pixels in a slice. The displacement is determined according to the value of pixels in previous or following slices through a process called motion compensation. Motion vectors and associated reference indices that indicate pixel displacement relative to a particular reference picture can be provided in the bitstream to a decoder, along with the residual between the original pixels and the motion compensated pixels. The decoder can use the residual and signaled motion vectors and reference indices to reconstruct a block of pixels in a reconstructed slice.

In JVET, motion vector accuracy can be stored at $\frac{1}{16}$ pel, and the difference between a motion vector and a CU's predicted motion vector can be coded with either quarterpel resolution or integer-pel resolution.

In JVET motion vectors can be found for multiple sub-CUs within a CU 102, using techniques such as advanced temporal motion vector prediction (ATMVP), spatial-temporal motion vector prediction (STMVP), affine motion compensation prediction, pattern matched motion vector derivation (PMMVD), and/or bi-directional optical flow (BIO).

Using ATMVP, the encoder can find a temporal vector for the CU 102 that points to a corresponding block in a reference picture. The temporal vector can be found based on motion vectors and reference pictures found for previously coded neighboring CUs 102. Using the reference block pointed to by a temporal vector for the entire CU 102, a motion vector can be found for each sub-CU within the CU 102.

STMVP can find motion vectors for sub-CUs by scaling and averaging motion vectors found for neighboring blocks previously coded with inter prediction, together with a temporal vector.

Affine motion compensation prediction can be used to predict a field of motion vectors for each sub-CU in a block, based on two control motion vectors found for the top corners of the block. For example, motion vectors for sub-CUs can be derived based on top corner motion vectors found for each 4×4 block within the CU 102.

PMMVD can find an initial motion vector for the current CU 102 using bilateral matching or template matching. Bilateral matching can look at the current CU 102 and reference blocks in two different reference pictures along a motion trajectory, while template matching can look at corresponding blocks in the current CU 102 and a reference picture identified by a template. The initial motion vector found for the CU 102 can then be refined individually for each sub-CU.

BIO can be used when inter prediction is performed with bi-prediction based on earlier and later reference pictures, and allows motion vectors to be found for sub-CUs based on the gradient of the difference between the two reference pictures.

In some situations local illumination compensation (LIC) can be used at the CU level to find values for a scaling factor parameter and an offset parameter, based on samples neighboring the current CU 102 and corresponding samples neighboring a reference block identified by a candidate motion vector. In JVET, the LIC parameters can change and be signaled at the CU level.

For some of the above methods the motion vectors found for each of a CU's sub-CUs can be signaled to decoders at the CU level. For other methods, such as PMMVD and BIO, motion information is not signaled in the bitstream to save overhead, and decoders can derive the motion vectors through the same processes.

After the motion vectors for a CU 102 have been found, the encoder can generate a prediction CU 402 using those motion vectors. In some cases, when motion vectors have been found for individual sub-CUs, Overlapped Block Motion Compensation (OBMC) can be used when generating a prediction CU 402 by combining those motion vectors with motion vectors previously found for one or more neighboring sub-CUs.

When bi-prediction is used, JVET can use decoder-side motion vector refinement (DMVR) to find motion vectors. DMVR allows a motion vector to be found based on two motion vectors found for bi-prediction using a bilateral template matching process. In DMVR, a weighted combination of prediction CUs 402 generated with each of the two motion vectors can be found, and the two motion vectors can be refined by replacing them with new motion vectors that best point to the combined prediction CU 402. The two refined motion vectors can be used to generate the final prediction CU 402.

At 408, once a prediction CU 402 has been found with intra prediction at 404 or inter prediction at 406 as described above, the encoder can subtract the prediction CU 402 from the current CU 102 find a residual CU 410.

The encoder can use one or more transform operations at 412 to convert the residual CU 410 into transform coefficients 414 that express the residual CU 410 in a transform domain, such as using a discrete cosine block transform (DCT-transform) to convert data into the transform domain. JVET allows more types of transform operations than HEVC, including DCT-II, DST-VII, DCT-VIII, DST-I, and DCT-V operations. The allowed transform operations can be grouped into sub-sets, and an indication of which sub-sets and which specific operations in those sub-sets were used can be signaled by the encoder. In some cases, large block-size transforms can be used to zero out high frequency transform coefficients in CUs 102 larger than a certain size, such that only lower-frequency transform coefficients are maintained for those CUs 102.

In some cases a mode dependent non-separable secondary transform (MDNSST) can be applied to low frequency transform coefficients 414 after a forward core transform. The MDNSST operation can use a Hypercube-Givens Transform (HyGT) based on rotation data. When used, an index value identifying a particular MDNSST operation can be signaled by the encoder.

At 416, the encoder can quantize the transform coefficients 414 into quantized transform coefficients 416. The quantization of each coefficient may be computed by dividing a value of the coefficient by a quantization step, which is derived from a quantization parameter (QP). In some embodiments, the Qstep is defined as $2(QP-4)/6$. Because high precision transform coefficients 414 can be converted into quantized transform coefficients 416 with a finite number of possible values, quantization can assist with data compression. Thus, quantization of the transform coefficients may limit an amount of bits generated and sent by the transformation process. However, while quantization is a lossy operation, and the loss by quantization cannot be recovered, the quantization process presents a trade-off between quality of the reconstructed sequence and an amount of information needed to represent the sequence. For example, a lower QP value can result in better quality decoded video, although a higher amount of data may be required for representation and transmission. In contrast, a high QP value can result in lower quality reconstructed video sequences but with lower data and bandwidth needs.

JVET can utilize variance-based adaptive quantization techniques, which allows every CU 102 to use a different quantization parameter for its coding process (instead of using the same frame QP in the coding of every CU 102 of the frame). The variance-based adaptive quantization techniques adaptively lowers the quantization parameter of certain blocks while increasing it in others. To select a specific QP for a CU 102, the CU's variance is computed. In brief, if a CU's variance is higher than the average variance of the frame, a higher QP than the frame's QP may be set for the CU 102. If the CU 102 presents a lower variance than the average variance of the frame, a lower QP may be assigned.

At 420, the encoder can find final compression bits 422 by entropy coding the quantized transform coefficients 418. Entropy coding aims to remove statistical redundancies of the information to be transmitted. In JVET, CABAC (Context Adaptive Binary Arithmetic Coding) can be used to code the quantized transform coefficients 418, which uses probability measures to remove the statistical redundancies. For CUs 102 with non-zero quantized transform coefficients 418, the quantized transform coefficients 418 can be converted into binary. Each bit ("bin") of the binary representation can then be encoded using a context model. A CU 102 can be broken up into three regions, each with its own set of context models to use for pixels within that region.

Multiple scan passes can be performed to encode the bins. During passes to encode the first three bins (bin0, bin1, and bin2), an index value that indicates which context model to use for the bin can be found by finding the sum of that bin position in up to five previously coded neighboring quantized transform coefficients 418 identified by a template.

A context model can be based on probabilities of a bin's value being '0' or '1'. As values are coded, the probabilities in the context model can be updated based on the actual number of '0' and '1' values encountered. While HEVC used fixed tables to re-initialize context models for each new picture, in JVET the probabilities of context models for new inter-predicted pictures can be initialized based on context models developed for previously coded interpredicted pictures.

The encoder can produce a bitstream that contains entropy encoded bits 422 of residual CUs 410, prediction information such as selected intra prediction modes or motion vectors, indicators of how the CUs 102 were partitioned from a CTU 100 according to the QTBT structure, and/or other information about the encoded video. The bitstream can be decoded by a decoder as discussed below.

In addition to using the quantized transform coefficients 418 to find the final compression bits 422, the encoder can also use the quantized transform coefficients 418 to generate reconstructed CUs 434 by following the same decoding process that a decoder would use to generate reconstructed CUs 434. Thus, once the transformation coefficients have been computed and quantized by the encoder, the quantized transform coefficients 418 may be transmitted to the decoding loop in the encoder. After quantization of a CU's transform coefficients, a decoding loop allows the encoder to generate a reconstructed CU 434 identical to the one the decoder generates in the decoding process. Accordingly, the encoder can use the same reconstructed CUs 434 that a decoder would use for neighboring CUs 102 or reference pictures when performing intra prediction or inter prediction for a new CU 102. Reconstructed CUs 102, reconstructed slices, or full reconstructed frames may serve as references for further prediction stages.

At the encoder's decoding loop (and see below, for the same operations in the decoder) to obtain pixel values for the reconstructed image, a dequantization process may be performed. To dequantize a frame, for example, a quantized value for each pixel of a frame is multiplied by the quantization step, e.g., (Qstep) described above, to obtain reconstructed dequantized transform coefficients 426. For example, in the decoding process shown in FIG. 4 in the encoder, the quantized transform coefficients 418 of a residual CU 410 can be dequantized at 424 to find dequantized transform coefficients 426. If an MDNSST operation was performed during encoding, that operation can be reversed after dequantization.

At 428, the dequantized transform coefficients 426 can be inverse transformed to find a reconstructed residual CU 430, such as by applying a DCT to the values to obtain the reconstructed image. At 432 the reconstructed residual CU 430 can be added to a corresponding prediction CU 402 found with intra prediction at 404 or inter prediction at 406, in order to find a reconstructed CU 434.

At 436, one or more filters can be applied to the reconstructed data during the decoding process (in the encoder or, as described below, in the decoder), at either a picture level or CU level. For example, the encoder can apply a deblocking filter, a sample adaptive offset (SAO) filter, and/or an adaptive loop filter (ALF). The encoder's decoding process may implement filters to estimate and transmit to a decoder the optimal filter parameters that can address potential artifacts in the reconstructed image. Such improvements increase the objective and subjective quality of the reconstructed video. In deblocking filtering, pixels near a sub-CU boundary may be modified, whereas in SAO, pixels in a CTU 100 may be modified using either an edge offset or band offset classification. JVET's ALF can use filters with circularly symmetric shapes for each 2×2 block. An indication of the size and identity of the filter used for each 2×2 block can be signaled.

If reconstructed pictures are reference pictures, they can be stored in a reference buffer 438 for inter prediction of future CUs 102 at 406.

During the above steps, JVET allows a content adaptive clipping operations to be used to adjust color values to fit between lower and upper clipping bounds. The clipping bounds can change for each slice, and parameters identifying the bounds can be signaled in the bitstream.

Figure 6:
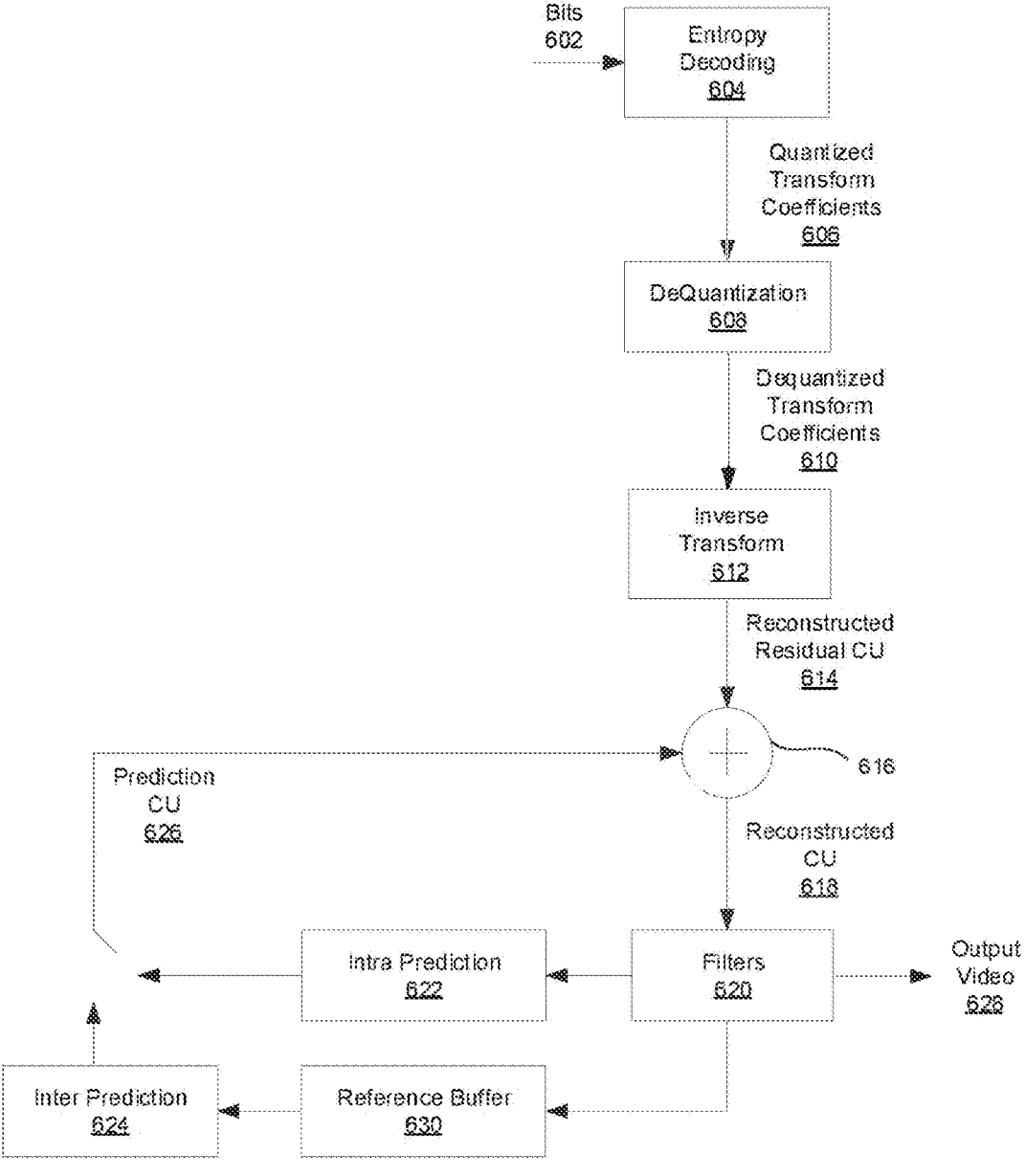
FIG. 6 depicts a simplified block diagram for CU coding in a JVET of VVC decoder.

FIG. 6 depicts a simplified block diagram for CU coding in a JVET decoder. A JVET decoder can receive a bitstream containing information about encoded CUs 102. The bitstream can indicate how CUs 102 of a picture were partitioned from a CTU 100 according to a QTBT structure, prediction information for the CUs 102 such as intra prediction modes or motion vectors, and bits 602 representing entropy encoded residual CUs.

At 604 the decoder can decode the entropy encoded bits 602 using the CABAC context models signaled in the bitstream by the encoder. The decoder can use parameters signaled by the encoder to update the context models' probabilities in the same way they were updated during encoding.

After reversing the entropy encoding at 604 to find quantized transform coefficients 606, the decoder can dequantize them at 608 to find dequantized transform coefficients 610. If an MDNSST operation was performed during encoding, that operation can be reversed by the decoder after dequantization.

At 612, the dequantized transform coefficients 610 can be inverse transformed to find a reconstructed residual CU 614. At 616, the reconstructed residual CU 614 can be added to a corresponding prediction CU 626 found with intra prediction at 622 or inter prediction at 624, in order to find a reconstructed CU 618.

At 620, one or more filters can be applied to the reconstructed data, at either a picture level or CU level. For example, the decoder can apply a deblocking filter, a sample adaptive offset (SAO) filter, and/or an adaptive loop filter (ALF). As described above, the in-loop filters located in the decoding loop of the encoder may be used to estimate optimal filter parameters to increase the objective and subjective quality of a frame. These parameters are transmitted to the decoder to filter the reconstructed frame at 620 to match the filtered reconstructed frame in the encoder.

After reconstructed pictures have been generated by finding reconstructed CUs 618 and applying signaled filters, the decoder can output the reconstructed pictures as output video 628. If reconstructed pictures are to be used as reference pictures, they can be stored in a reference buffer 630 for inter prediction of future CUs 102 at 624.

Figure 7:
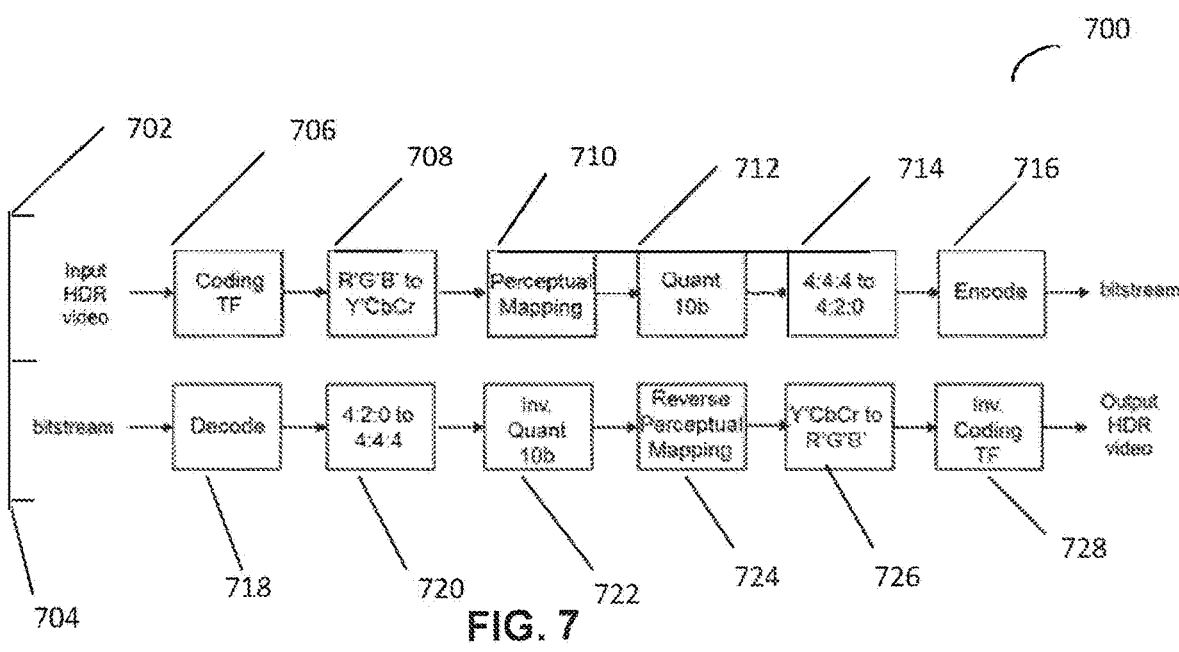
FIG. 7 depicts a block diagram of an HDR encoder/decoder system.

FIG. 7 depicts a block diagram 700 of HDR encoding 702 and decoding 704. One common HDR video format uses a linear light RGB domain, where each channel is specified in a high bit depth format; by way of non-limiting example, a half-float format for an EXR file format. Since current video compression algorithms cannot directly handle HDR video formats, one approach to encode HDR video is to first convert it into a format that the video encoder can accept. The decoder video can then be converted back to an HDR format. An example of such a system is shown in FIG. 7, where the encode 702 and decode 704 modules correspond to the processes described herein for JVET coding of SDR content.

The top system in FIG. 7 shows an example conversion of the input HDR video format into a 10-bit 4:2:0 video format that can be encoded using a JVET encoder (or Main 10 HEVC encoder, etc.). In order to prepare for conversion of the high-bit depth input into a lower bit depth, each RGB channel in the input HDR video is first passed through a coding transfer function (TF) 706. The output R'G'B' is then transformed to a color space Y'CbCr 708 that is more suitable for video coding. Perceptual mapping is then performed in step 710 and each channel is then quantized to 10 bits in step 712. After uniform quantization of each channel to 10 bits in step 712, the chroma Cb and Cr channels are subsampled to a 4:2:0 format in step 714. The encoder then compresses the 10-bit 4:2:0 video, for example using a Main 10 HEVC encoder in step 716.

The bottom system in FIG. 7 reconstructs the output HDR video from the input bitstream. In one example the bitstream is decoded in step 817 and a JVET decoder (or Main 10 HEVC decoder, or other known, convenient and/or desired decoder) reconstructs the 10-bit 4:2:0 video, and the reconstructed video is upsampled to a 4:4:4 format in step 720. After the inverse quantization re-mapping of the 10-bit data in step 722, reverse perceptual mapping is applied in step 724 to generate Y'CbCr values. The Y'CbCr data can then be converted to an R'G'B' color space in step 726, and the channels can undergo an inverse coding TF operation in step 728 before the HDR video data is output.

Blocking artifacts are largely the result of independent coding of neighboring units in block-based video coding. They tend to occur and be visible at low bit rates, when the intra/inter coding type of neighboring blocks is different, and in areas that have low spatial activity. The result is a visual artifact caused by the artificial discontinuity or boundary introduced.

Deblocking filters such as those in HEVC [1] and the current JVET attempt to reduce the visual artifact by smoothing or low pass filtering across the PU/TU or CU boundaries. In some embodiments, vertical boundaries are filtered first, followed by horizontal boundaries. Up to four reconstructed luma pixel values in a 4×4 region on either side of the boundary can be used in filtering up to three pixels on either side of the boundary. In normal or weak filtering, up to two pixels on either side can be filtered, and in strong filtering three pixels on either side are filtered. The decision whether to filter pixels can be based upon neighboring block intra/inter mode decision, motion information, and residual information to generate a boundary strength value Bs of 0, 1 or 2. If Bs>0, smoothness conditions can be checked on the first and last rows (or columns) in the 4×4 regions on either side of the vertical (or horizontal) boundary. These conditions can determine how much deviation there is from a ramp across a given boundary. Generally, if the deviation is less than a threshold specified by a parameter β, deblocking filtering can be applied on the entire 4×4 region and large deviations can indicate the presence of a true or intended boundary and so deblocking filtering may not be performed. The beta parameter is a non-decreasing function of the block QP value, such that larger QP values correspond to larger thresholds. In some embodiments, if Bs>0 and the smoothness condition are met, a decision between strong and weak filtering can be made based upon additional smoothness conditions and another parameter tc that is also a non-decreasing function of QP. In general, strong filtering is applied to smoother regions as discontinuities are more visually apparent in such regions.

In some embodiments, the deblocking filter operation is effectively a 4 or 5-tap filtering operation, but where the difference between the input and filtered output is first clipped and then added back to (or subtracted from) the input. The clipping attempts to limit oversmoothing and the clipping level can be determined by tc and QP. For chroma deblocking, a 4-tap filter can be applied to the one pixel on either side of the boundary when at least one of the blocks is intra coded.

Deblocking artifacts can result from mismatches at block boundaries (e.g. CU, prediction, transform boundaries, and/or other segmentation boundaries). These differences can be in DC level, alignment, phase, and/or other data. As such, the boundary differences can be considered as noise that is added to the signal. As shown in FIG. 7, although the original input HDR signal goes through both a coding TF and an inverse coding TF, the deblocking noise goes through only the inverse coding TF. Traditional SDR deblocking artifacts have not considered this additional TF and have been developed where the output of the decoder in FIG. 7 is viewed. In the case of HDR, the deblocking noise goes through the inverse coding TF and the visibility of the artifact can be altered. As such, the same discontinuity jump in both a bright or dark area can result in a larger or smaller discontinuity jump after the inverse coding TF operation.

Figure 8:
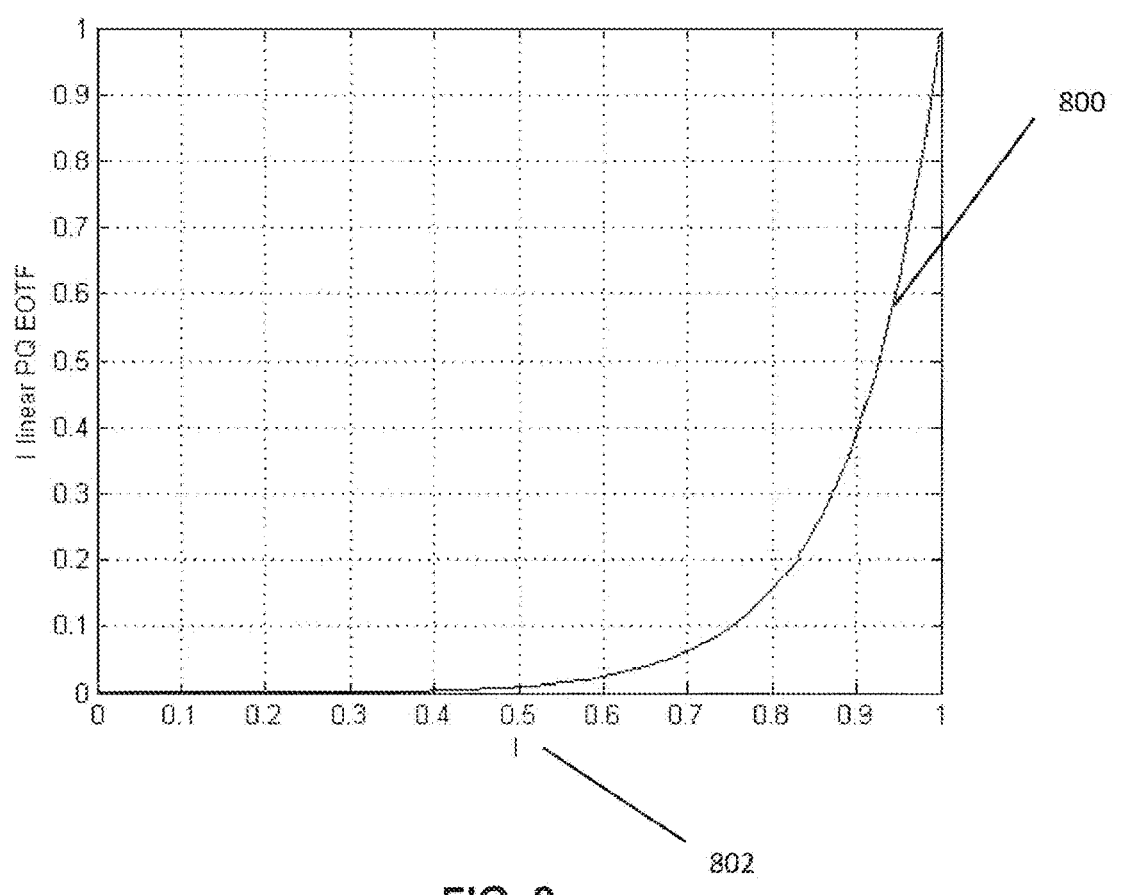
FIG. 8 depicts an embodiment of a normalized PQ v. normalized intensity curve.
Figure 9:
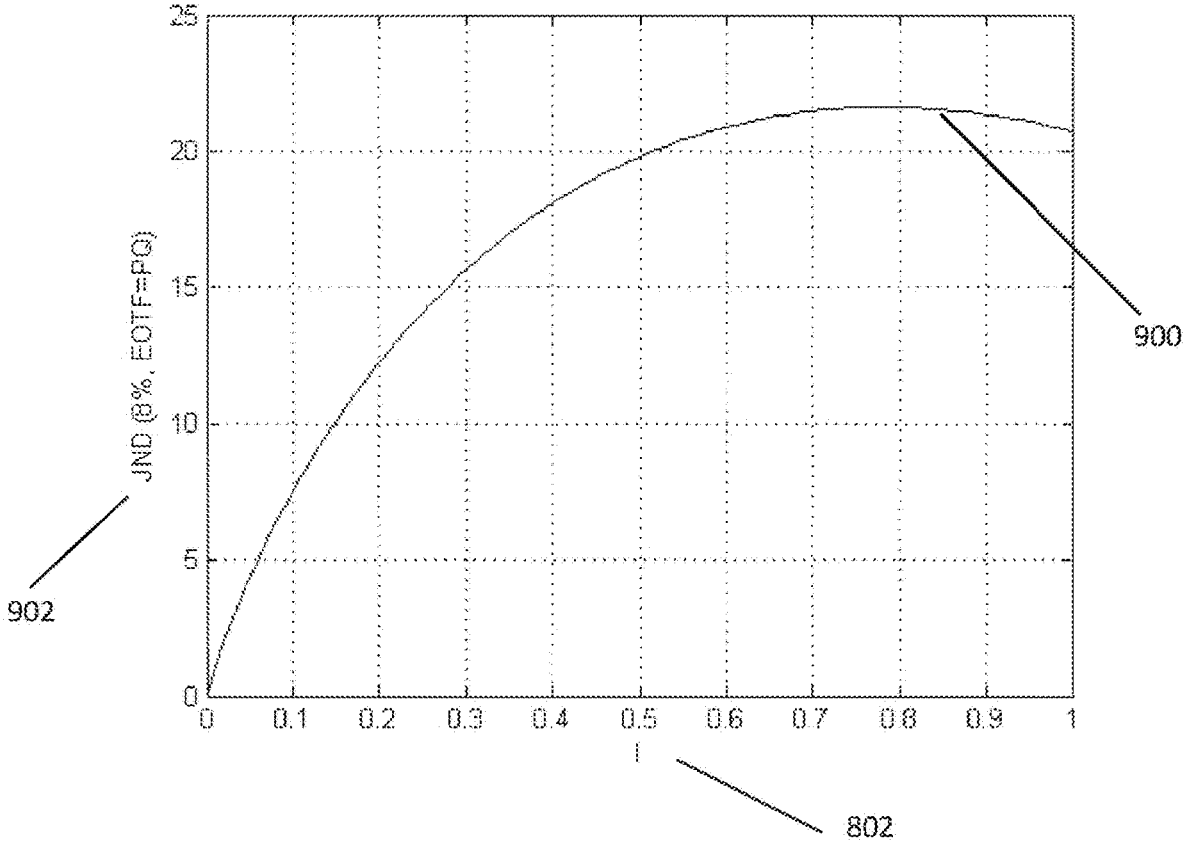
FIG. 9 depicts an embodiment of a JND v. normalized intensity curve.

Typical inverse coding TFs (often known as EOTFs) such as PQ, HLG, and Gamma, have the property that they are monotonically increasing functions of intensity and FIG. 8 depicts a normalized PQ EOTF curve 800 plotted v. intensity (I) 802. For example, a normalized PQ EOTF curve 800 is depicted in FIG. 8. Since the slope of the PQ EOTF curve 800 is increasing, discontinuity jumps will become magnified by the EOTF in brighter areas vs. darker areas, thereby potentially making the deblocking artifact more visible. Based on Weber's Law it is understood that a viewer can tolerate a larger difference in brighter areas as the JND (just noticeable difference) is larger. However, FIG. 9 which depicts a normalized plot 900 of JND 902 plotted against intensity 802, shows that even accounting for Weber's Law, the JND decreases at high intensities for the PQ EOTF. FIG. 9 is calculated based upon an α=8% Weber's Law JND threshold, and shows that the peak JND does not seem to be very sensitive to a wide range of thresholds for PQ. In fact, the peak JND for PQ appears to occur at around the unity slope on the PQ EOTF in FIG. 8, and this occurs at about I=78% (normalized) peak intensity. Alternate testing shows that for the case of the HLG EOTF, peak JND intensity appears to occur at roughly I=50% (normalized) while unity slope occurs at around 70% (normalized).

Based on this analysis and related visual observations, it becomes evident that deblocking filter operations which are dependent upon intensity will yield improved performance. That is, by way of non-limiting example, deblocking filter coefficients, strength of filtering applied (normal vs. weak), number of input and output pixels used or affected, decisions for filtering on/off, and other filtering criteria can be impacted by and therefore based upon intensity. Intensity can be for luma and/or chroma, and it can be based on either non-linear or linear intensity. In some embodiments, the intensity can be computed based upon localized intensity, such as based upon CU intensity or a neighborhood of pixels around a block boundary. In some embodiments, the intensity can be a maximum, minimum, average, or some other statistic or metric based upon neighborhood pixel luma/chroma values. In alternate embodiments, the deblocking filtering can be based upon intensity of a frame or group of frames, per scene, sequence, or other inter or intra unit value.

In some embodiments, the deblocking operation can be determined based upon intensity operations computed in the encoder and/or decoder, or parameter(s) can be sent in the bitstream to the decoder to be used in making deblocking decisions or filtering operations. Parameters can be sent at the CU, slice, picture, PPS, SPS levels, and/or any other known, convenient and/or desired levels.

Intensity-based deblocking can also be applied to SDR content, however, it is expected that intensity-based deblocking will have a bigger impact with HDR content due to the inverse coding TF applied for HDR. In some embodiments, deblocking can be based upon the inverse coding TF (or coding TF). The TF information can be signaled in the bitstream and used by the deblocking operation. By way of non-limiting example, different deblocking strategies can be used based upon whether intensity (local or aggregate) is greater or less than some threshold, and this threshold can be based upon the TF. Additionally, in some embodiments, more than one threshold can be identified and associated with multiple levels of filtering operation. In some embodiments, example deblocking strategies can include filtering vs. no filtering, strong vs. weak filtering, and/or various levels of filtering based upon various intensity level trigger values. In some embodiments it can be determined that deblocking filtering is not necessary after the inverse coding TF, because the artifact may be less visible (or no longer visible), thus reducing computation demands. A value for I* (normalized intensity value) can be signaled, computed, or specified based upon the TF and used as a threshold in determination of filtering. In some embodiments, more than one threshold can be used for modifying deblocking filter operation.

Modifications can be made to existing SDR deblocking in HEVC or JVET to incorporate intensity-based deblocking for HDR. By way of non-limiting example, in HEVC the deblocking parameters β (and tc) can be modified based upon intensity to increase or decrease strong/normal filtering or filtering on/off and different β (and tc) parameter curves can be defined for HDR based upon intensity values or a range of intensity values. Alternately, a shift or offset can be applied to the parameter and curves based on intensities in a neighborhood of a boundary, CU, region, or group of frames. By way of non-limiting example, the shift can be applied so that stronger filtering is applied in brighter areas.

Figure 10:
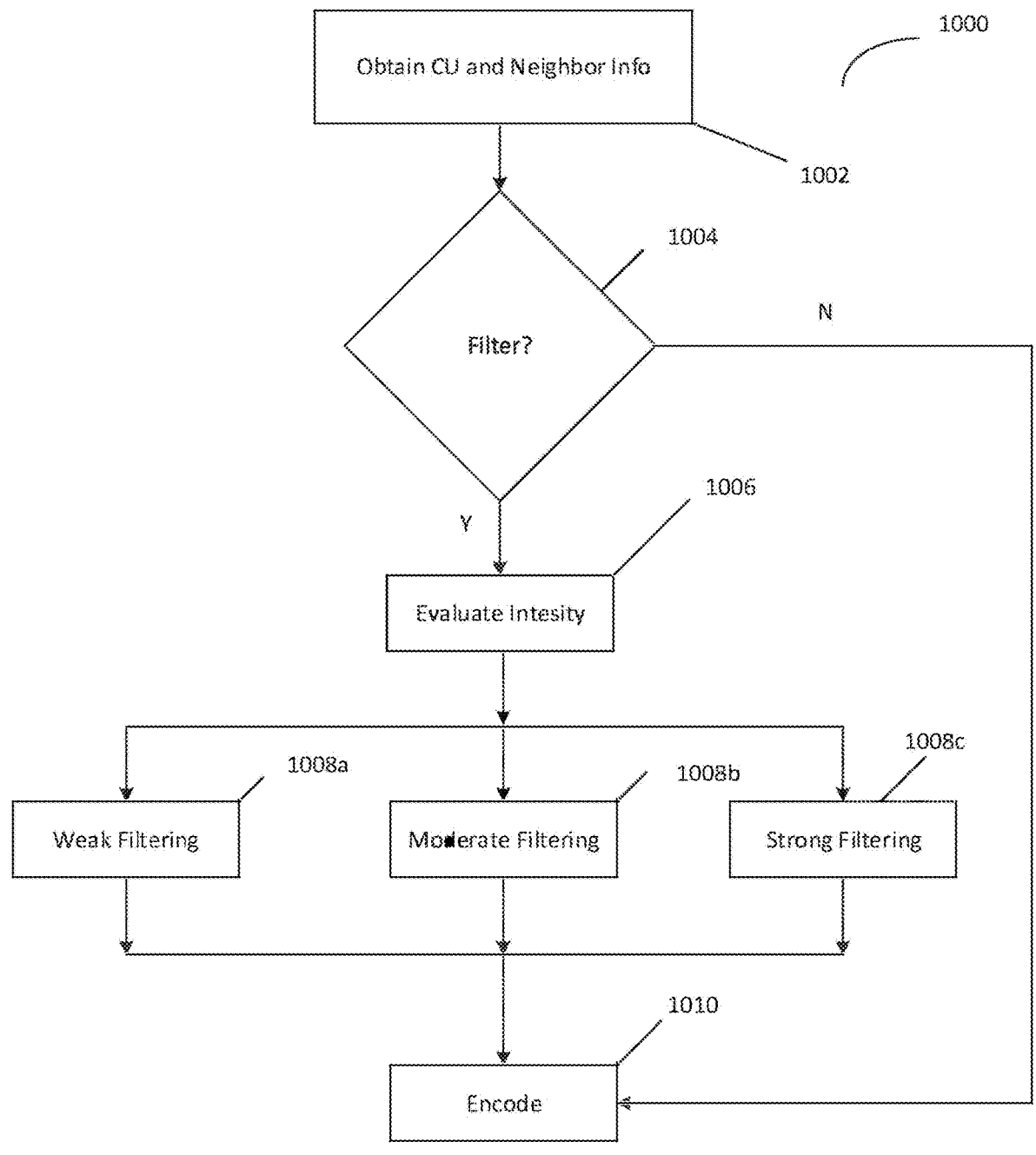
FIG. 10 depicts an embodiment of a block diagram of an encoding system based at least in part on intensity.

FIG. 10 depicts a block diagram of an encoding system 1000 in which intensity is taken into account for purposes of determining filtering. In step 1002 information regarding the coding unit and adjacent/neighboring coding units can be obtained. Then in step 1004 a determination regarding whether filtering is to be applied can be made. If in step 1004 it is determined that filtering is to be applied, then in step 1006 intensity values associated with the coding unit and/or adjacent/neighboring coding unit(s) can be evaluated. Based upon the evaluation of the intensity values in step 1006 a desired level of filtering can be applied to the coding unit in one of steps 1008a-1008c. In some embodiments, the selection of the level of filtering can be based upon an intensity value of the coding unit and/or a comparison of the intensity values associated with the coding unit and intensity values associated one or more adjacent coding units. In some embodiments, this can be based upon one or more established threshold intensity values. After filtering is applied in one of steps 1008a-1008c, the coding unit can be encoded for transmission in step 1010. However, if in step 1004 it is determined that filtering should not be applied, then 1006-1008c can be bypassed that the unfiltered coding unit can proceed directly to encoding in step 1010.

In alternate embodiments, step 1006 can precede step 1004 and the evaluation of the intensities can be used in the determination of filtering in step 1006 and step 1004 can be followed directly by either encoding in step 1010, if filtering is not desired, or by one of steps 1008a-1008c, if filtering is desired.

Figure 11:
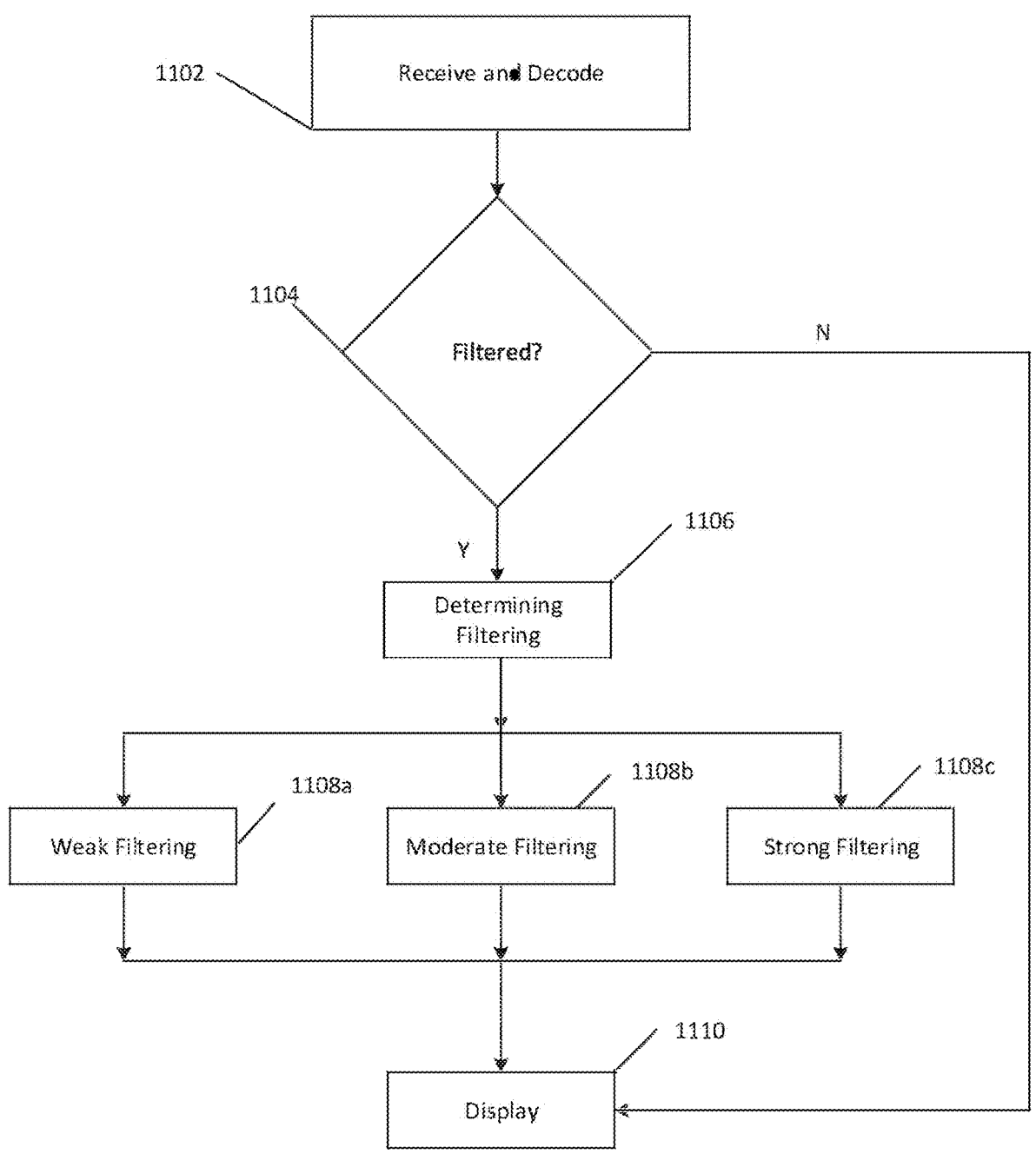
FIG. 11 depicts an embodiment of a block diagram of a decoding system based at least in part on intensity.

FIG. 11 depicts a block diagram of a decoding system in which intensity is a factor accounted for in filtering for display. In the embodiment depicted in FIG. 11, a bitstream can be received and decoded in step 1102. In some embodiments, in step 1104 an appropriate and/or desired level of deblocking can be determined. However, in some alternate embodiments, in step 1104 it can be determined whether filtering was applied during the encoding phase. If in step 1104 it is determined that filtering is desired (or in some embodiments was applied during the encoding phase), then in step 1106 the level of filtering is determined. In some embodiments, this can be an offset value for use in establishing one or more factors associated with filtering and/or it can be an indicator of the level of filtering applied during the encoding phase. Based at least in part on the determination in step 1106, the level of filtering 1108a-1108c to be applied for rendering of the image for display in step 1110. If in step 1104 that no filtering was applied during the encoding phase, then the image can be rendered for display in step 1110.

Figures 12A, 12B, 12C:
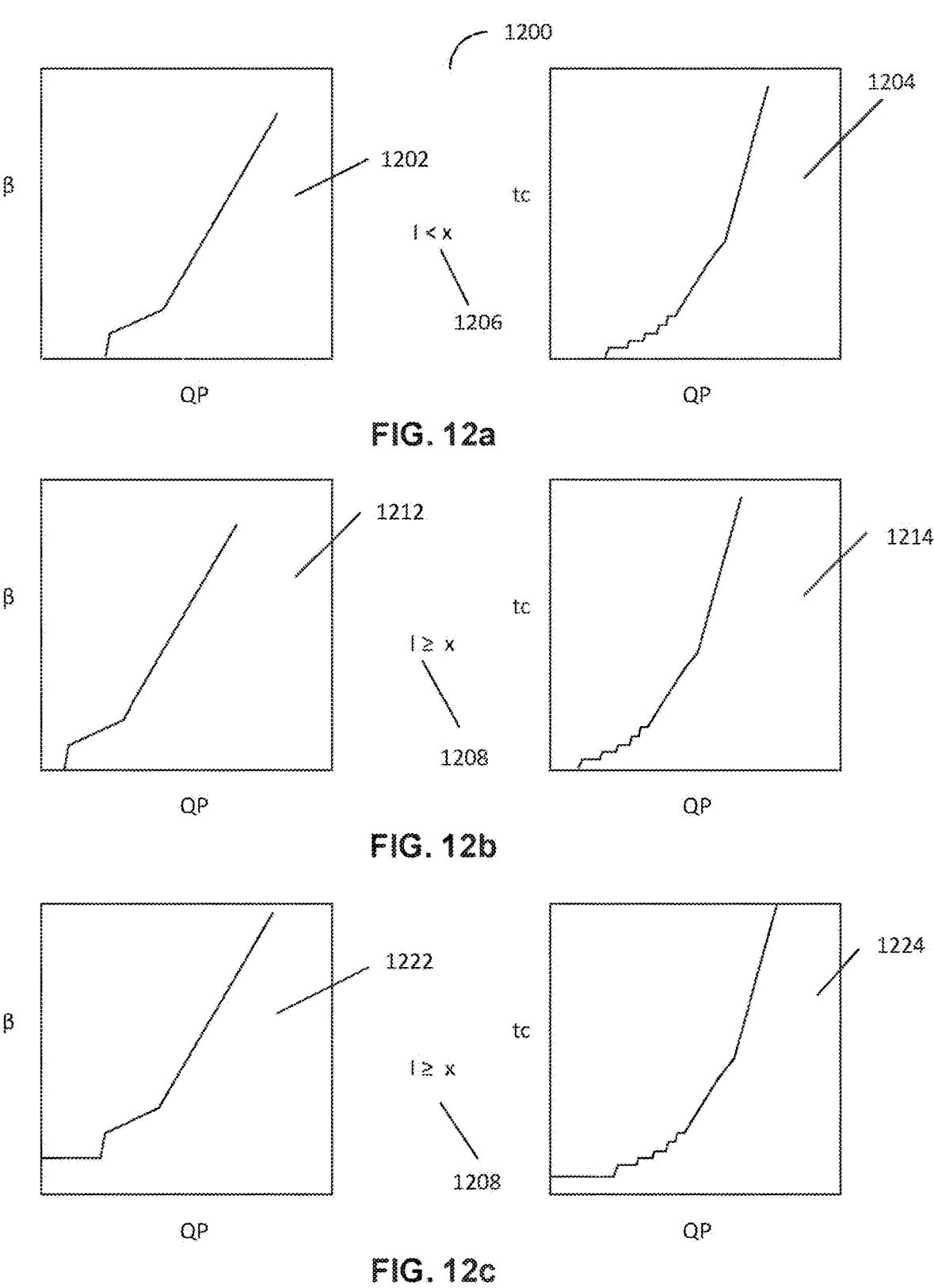
FIGS. 12a-12c depict a series of exemplary β & tc v. QP curves that graphically represent the system described and depicted in FIGS. 10 and 11.

FIGS. 12a-12c depict a series of exemplary β & tc v. QP curves 1200 that graphically represent the system described and depicted in FIGS. 10 and 11. In the embodiment depicted in FIG. 12a, an exemplary pair of β & tc v. QP curves 1202 1204 is presented which can be employed if an intensity is below a desired threshold 1206 of x. Thus, in cases in which intensity values fall below a desired value 1202 of x, normal or standard values of β and tc can be used to determine deblocking levels to be applied. FIGS. 12b and 12c depict alternate β & tc v. QP curves 1212 1214 1222

1224 that can be employed if it is determined that intensity is greater-than-equal-to a desired value of x 1208. FIG. 12b represents the same set of curves 1212 1214 shown in FIG. 12a but shifted to the left and FIG. 12c represents the same set of curves 1222 1224 shown in FIG. 12a but shifted up. Thus, in cases in which intensity values meet (or exceed) a desired value of x, offset, non-standard or modified values of β and tc can be used to determine deblocking levels applied. Accordingly, when intensity values increase, increased values of β and tc will be selected and the level of filtering applied will be increased. While FIGS. 12b-12c depict variants in which intensity (I) is greater than or greater-than-equal to a single value of x, it should be well understood that the system can be expanded to encompass system in which there are multiple sets of β & tc v. QP curves each associated with various boundaries. That is, conditions are envisioned in which there may be conditions such as I<x, x≤I≤y, and I>y and/or system employing multiple boundaries or regions. Additionally, it should be noted that the use of <, >, ≤, and ≥ is arbitrary and any logical boundary conditions can be employed. Finally, it should be well understood that the curves represented in FIGS. 12a-12c are exemplary in nature and that the same or similar techniques, methods and logic can be applied to any known, convenient and/or desired set of curves.

Figure 13:
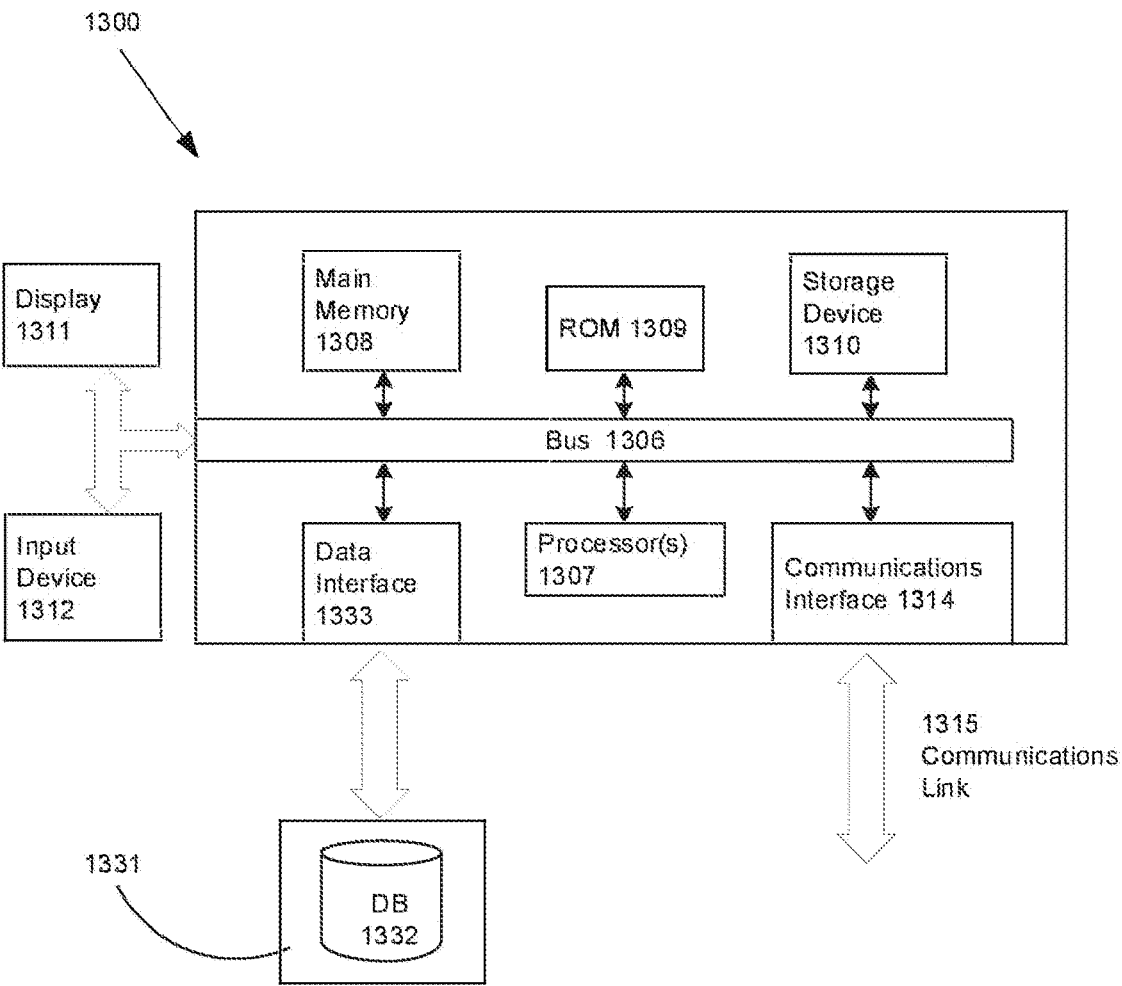
FIG. 13 depicts an embodiment of a computer system adapted and configured to provide for variable template size for template matching.

The execution of the sequences of instructions required to practice the embodiments can be performed by a computer system 1300 as shown in FIG. 13. In an embodiment, execution of the sequences of instructions is performed by a single computer system 1300. According to other embodiments, two or more computer systems 1300 coupled by a communication link 1315 can perform the sequence of instructions in coordination with one another. Although a description of only one computer system 1300 will be presented below, however, it should be understood that any number of computer systems 1300 can be employed to practice the embodiments.

A computer system 1300 according to an embodiment will now be described with reference to FIG. 13, which is a block diagram of the functional components of a computer system 1300. As used herein, the term computer system 1300 is broadly used to describe any computing device that can store and independently run one or more programs.

Each computer system 1300 can include a communication interface 1314 coupled to the bus 1306. The communication interface 1314 provides two-way communication between computer systems 1300. The communication interface 1314 of a respective computer system 1300 transmits and receives electrical, electromagnetic or optical signals, that include data streams representing various types of signal information, e.g., instructions, messages and data. A communication link 1315 links one computer system 1300 with another computer system 1300. For example, the communication link 1315 can be a LAN, in which case the communication interface 1314 can be a LAN card, or the communication link 1315 can be a PSTN, in which case the communication interface 1314 can be an integrated services digital network (ISDN) card or a modem, or the communication link 1315 can be the Internet, in which case the communication interface 1314 can be a dial-up, cable or wireless modem.

A computer system 1300 can transmit and receive messages, data, and instructions, including program, i.e., application, code, through its respective communication link 1315 and communication interface 1314. Received program code can be executed by the respective processor(s) 1307 as it is received, and/or stored in the storage device 1310, or other associated non-volatile media, for later execution.

In an embodiment, the computer system 1300 operates in conjunction with a data storage system 1331, e.g., a data storage system 1331 that contains a database 1332 that is readily accessible by the computer system 1300. The computer system 1300 communicates with the data storage system 1331 through a data interface 1333. A data interface 1333, which is coupled to the bus 1306, transmits and receives electrical, electromagnetic or optical signals, that include data streams representing various types of signal information, e.g., instructions, messages and data. In embodiments, the functions of the data interface 1333 can be performed by the communication interface 1314.

Computer system 1300 includes a bus 1306 or other communication mechanism for communicating instructions, messages and data, collectively, information, and one or more processors 1307 coupled with the bus 1306 for processing information. Computer system 1300 also includes a main memory 1308, such as a random access memory (RAM) or other dynamic storage device, coupled to the bus 1306 for storing dynamic data and instructions to be executed by the processor(s) 1307. The main memory 1308 also can be used for storing temporary data, i.e., variables, or other intermediate information during execution of instructions by the processor(s) 1307.

The computer system 1300 can further include a read only memory (ROM) 1309 or other static storage device coupled to the bus 1306 for storing static data and instructions for the processor(s) 1307. A storage device 1310, such as a magnetic disk or optical disk, can also be provided and coupled to the bus 1306 for storing data and instructions for the processor(s) 1307.

A computer system 1300 can be coupled via the bus 1306 to a display device 1311, such as, but not limited to, a cathode ray tube (CRT) or a liquid-crystal display (LCD) monitor, for displaying information to a user. An input device 1312, e.g., alphanumeric and other keys, is coupled to the bus 1306 for communicating information and command selections to the processor(s) 1307.

According to one embodiment, an individual computer system 1300 performs specific operations by their respective processor(s) 1307 executing one or more sequences of one or more instructions contained in the main memory 1308. Such instructions can be read into the main memory 1308 from another computer-usable medium, such as the ROM 1309 or the storage device 1310. Execution of the sequences of instructions contained in the main memory 1308 causes the processor(s) 1307 to perform the processes described herein. In alternative embodiments, hard-wired circuitry can be used in place of or in combination with software instructions. Thus, embodiments are not limited to any specific combination of hardware circuitry and/or software.

The term "computer-usable medium," as used herein, refers to any medium that provides information or is usable by the processor(s) 1307. Such a medium can take many forms, including, but not limited to, non-volatile, volatile and transmission media. Non-volatile media, i.e., media that can retain information in the absence of power, includes the ROM 1309, CD ROM, magnetic tape, and magnetic discs. Volatile media, i.e., media that can not retain information in the absence of power, includes the main memory 1308. Transmission media includes coaxial cables, copper wire and fiber optics, including the wires that comprise the bus 1306. Transmission media can also take the form of carrier waves; i.e., electromagnetic waves that can be modulated, as in frequency, amplitude or phase, to transmit information signals. Additionally, transmission media can take the form of acoustic or light waves, such as those generated during radio wave and infrared data communications.

In the foregoing specification, the embodiments have been described with reference to specific elements thereof. It will, however, be evident that various modifications and changes can be made thereto without departing from the broader spirit and scope of the embodiments. For example, the reader is to understand that the specific ordering and combination of process actions shown in the process flow diagrams described herein is merely illustrative, and that using different or additional process actions, or a different combination or ordering of process actions can be used to enact the embodiments. The specification and drawings are, accordingly, to be regarded in an illustrative rather than restrictive sense.

It should also be noted that the present invention can be implemented in a variety of computer systems. The various techniques described herein can be implemented in hardware or software, or a combination of both. Preferably, the techniques are implemented in computer programs executing on programmable computers that each include a processor, a storage medium readable by the processor (including volatile and non-volatile memory and/or storage elements), at least one input device, and at least one output device. Program code is applied to data entered using the input device to perform the functions described above and to generate output information. The output information is applied to one or more output devices. Each program is preferably implemented in a high level procedural or object oriented programming language to communicate with a computer system. However, the programs can be implemented in assembly or machine language, if desired. In any case, the language can be a compiled or interpreted language. Each such computer program is preferably stored on a storage medium or device (e.g., ROM or magnetic disk) that is readable by a general or special purpose programmable computer for configuring and operating the computer when the storage medium or device is read by the computer to perform the procedures described above. The system can also be considered to be implemented as a computer-readable storage medium, configured with a computer program, where the storage medium so configured causes a computer to operate in a specific and predefined manner. Further, the storage elements of the exemplary computing applications can be relational or sequential (flat file) type computing databases that are capable of storing data in various combinations and configurations.

Figure 14:
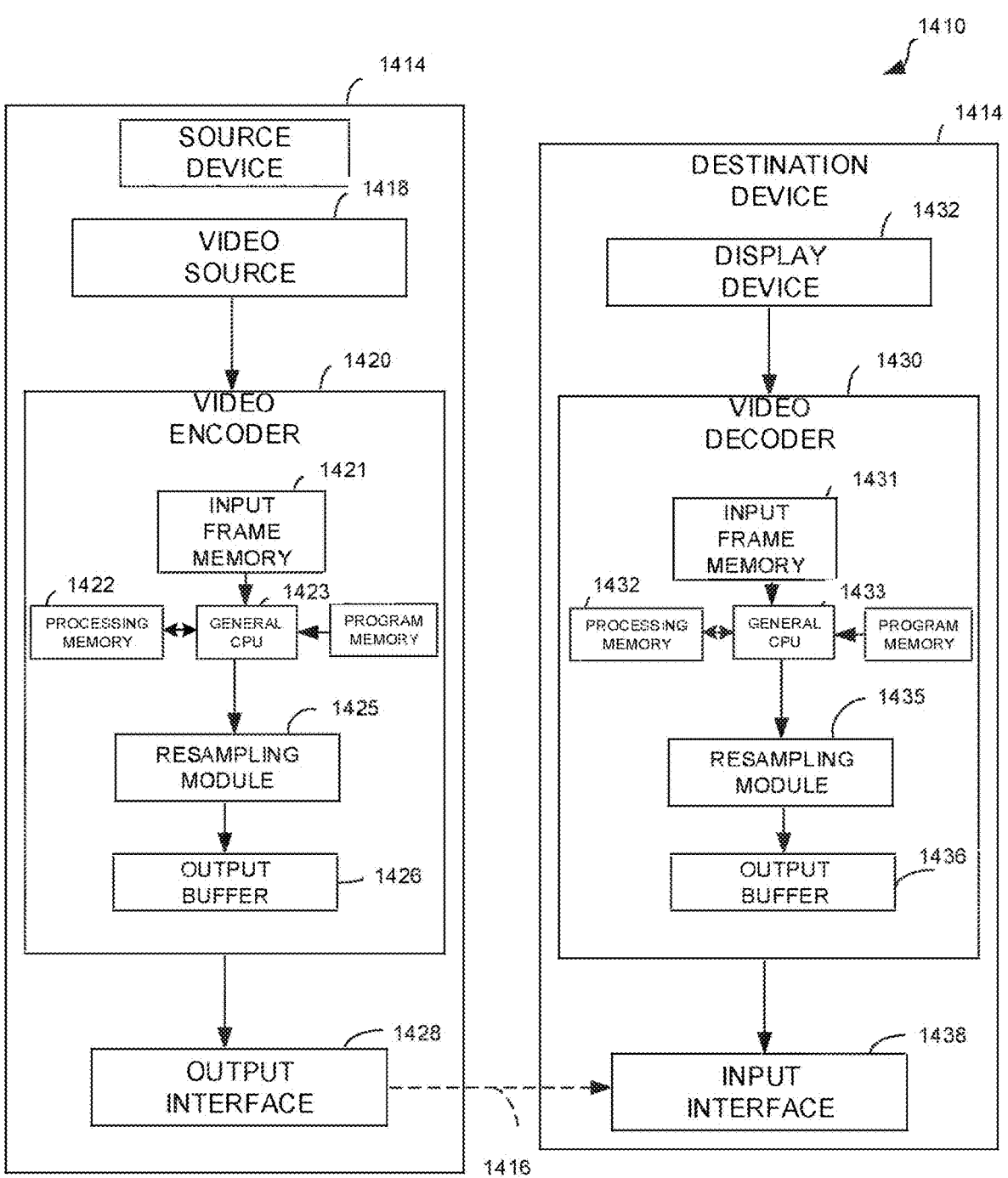
FIG. 14 depicts an embodiment of video encoder/decoder adapted and configured to provide for variable template size for template matching.

FIG. 14 is a high level view of a source device 1412 and destination device 1410 that may incorporate features of the systems and devices described herein. As shown in FIG. 14, example video coding system 1410 includes a source device 1412 and a destination device 1414 where, in this example, the source device 1412 generates encoded video data. Accordingly, source device 1412 may be referred to as a video encoding device. Destination device 1414 may decode the encoded video data generated by source device 1412. Accordingly, destination device 1414 may be referred to as a video decoding device. Source device 1412 and destination device 1414 may be examples of video coding devices.

Destination device 1414 may receive encoded video data from source device 1412 via a channel 1416. Channel 1416 may comprise a type of medium or device capable of moving the encoded video data from source device 1412 to destination device 1414. In one example, channel 1416 may comprise a communication medium that enables source device 1412 to transmit encoded video data directly to destination device 1414 in real-time.

In this example, source device 1412 may modulate the encoded video data according to a communication standard, such as a wireless communication protocol, and may transmit the modulated video data to destination device 1414. The communication medium may comprise a wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or other equipment that facilitates communication from source device 1412 to destination device 1414. In another example, channel 1416 may correspond to a storage medium that stores the encoded video data generated by source device 1412.

In the example of FIG. 14, source device 1412 includes a video source 1418, video encoder 1420, and an output interface 1422. In some cases, output interface 1428 may include a modulator/demodulator (modem) and/or a transmitter. In source device 1412, video source 1418 may include a source such as a video capture device, e.g., a video camera, a video archive containing previously captured video data, a video feed interface to receive video data from a video content provider, and/or a computer graphics system for generating video data, or a combination of such sources.

Video encoder 1420 may encode the captured, pre-captured, or computer-generated video data. An input image may be received by the video encoder 1420 and stored in the input frame memory 1421. The general purpose processor 1423 may load information from here and perform encoding. The program for driving the general purpose processor may be loaded from a storage device, such as the example memory modules depicted in FIG. 14. The general purpose processor may use processing memory 1422 to perform the encoding, and the output of the encoding information by the general processor may be stored in a buffer, such as output buffer 1426.

The video encoder 1420 may include a resampling module 1425 which may be configured to code (e.g., encode) video data in a scalable video coding scheme that defines at least one base layer and at least one enhancement layer. Resampling module 1425 may resample at least some video data as part of an encoding process, wherein resampling may be performed in an adaptive manner using resampling filters.

The encoded video data, e.g., a coded bit stream, may be transmitted directly to destination device 1414 via output interface 1428 of source device 1412. In the example of FIG. 14, destination device 1414 includes an input interface 1438, a video decoder 1430, and a display device 1432. In some cases, input interface 1428 may include a receiver and/or a modem. Input interface 1438 of destination device 1414 receives encoded video data over channel 1416. The encoded video data may include a variety of syntax elements generated by video encoder 1420 that represent the video data. Such syntax elements may be included with the encoded video data transmitted on a communication medium, stored on a storage medium, or stored a file server.

The encoded video data may also be stored onto a storage medium or a file server for later access by destination device 1414 for decoding and/or playback. For example, the coded bitstream may be temporarily stored in the input buffer 1431, then loaded in to the general purpose processor 1433. The program for driving the general purpose processor may be loaded from a storage device or memory. The general purpose processor may use a process memory 1432 to perform the decoding. The video decoder 1430 may also include a resampling module 1435 similar to the resampling module 1425 employed in the video encoder 1420.

FIG. 14 depicts the resampling module 1435 separately from the general purpose processor 1433, but it would be appreciated by one of skill in the art that the resampling function may be performed by a program executed by the general purpose processor, and the processing in the video encoder may be accomplished using one or more processors. The decoded image(s) may be stored in the output frame buffer 1436 and then sent out to the input interface 1438.

Display device 1438 may be integrated with or may be external to destination device 1414. In some examples, destination device 1414 may include an integrated display device and may also be configured to interface with an external display device. In other examples, destination device 1414 may be a display device. In general, display device 1438 displays the decoded video data to a user.

Video encoder 1420 and video decoder 1430 may operate according to a video compression standard. ITU-T VCEG (Q6/16) and ISO/IEC MPEG (JTC 1/SC 29/WG 11) are studying the potential need for standardization of future video coding technology with a compression capability that significantly exceeds that of the current High Efficiency Video Coding HEVC standard (including its current extensions and near-term extensions for screen content coding and high-dynamic-range coding). The groups are working together on this exploration activity in a joint collaboration effort known as the Joint Video Exploration Team (JVET) to evaluate compression technology designs proposed by their experts in this area. A recent capture of JVET development is described in the "Algorithm Description of Joint Exploration Test Model 5 (JEM 5)", JVET-E1001-V2, authored by J. Chen, E. Alshina, G. Sullivan, J. Ohm, J. Boyce.

Additionally or alternatively, video encoder 1420 and video decoder 1430 may operate according to other proprietary or industry standards that function with the disclosed JVET features. Thus, other standards such as the ITU-T H.264 standard, alternatively referred to as MPEG-4, Part 10, Advanced Video Coding (AVC), or extensions of such standards. Thus, while newly developed for JVET, techniques of this disclosure are not limited to any particular coding standard or technique. Other examples of video compression standards and techniques include MPEG-2, ITU-T H.263 and proprietary or open source compression formats and related formats.

Video encoder 1420 and video decoder 1430 may be implemented in hardware, software, firmware or any combination thereof. For example, the video encoder 1420 and decoder 1430 may employ one or more processors, digital signal processors (DSPs), application specific integrated circuits (ASICs), field programmable gate arrays (FPGAs), discrete logic, or any combinations thereof. When the video encoder 1420 and decoder 1430 are implemented partially in software, a device may store instructions for the software in a suitable, non-transitory computer-readable storage medium and may execute the instructions in hardware using one or more processors to perform the techniques of this disclosure. Each of video encoder 1420 and video decoder 1430 may be included in one or more encoders or decoders, either of which may be integrated as part of a combined encoder/decoder (CODEC) in a respective device.

Aspects of the subject matter described herein may be described in the general context of computer-executable instructions, such as program modules, being executed by a computer, such as the general-purpose processors 1423 and 1433 described above. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

Examples of memory include random access memory (RAM), read only memory (ROM), or both. Memory may store instructions, such as source code or binary code, for performing the techniques described above. Memory may also be used for storing variables or other intermediate information during execution of instructions to be executed by a processor, such as processor 1423 and 1433.

A storage device may also store instructions, such as source code or binary code, for performing the techniques described above. A storage device may additionally store data used and manipulated by the computer processor. For example, a storage device in a video encoder 1420 or a video decoder 1430 may be a database that is accessed by computer system 1423 or 1433. Other examples of storage device include random access memory (RAM), read only memory (ROM), a hard drive, a magnetic disk, an optical disk, a CD-ROM, a DVD, a flash memory, a USB memory card, or any other medium from which a computer can read.

A memory or storage device may be an example of a non-transitory computer readable storage medium for use by or in connection with the video encoder and/or decoder. The non-transitory computer-readable storage medium contains instructions for controlling a computer system to be configured to perform functions described by particular embodiments. The instructions, when executed by one or more computer processors, may be configured to perform that which is described in particular embodiments.

Also, it is noted that some embodiments have been described as a process which can be depicted as a flow diagram or block diagram. Although each may describe the operations as a sequential process, many of the operations can be performed in parallel or concurrently. In addition, the order of the operations may be rearranged. A process may have additional steps not included in the figures.

Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments. The computer system may include one or more computing devices. The instructions, when executed by one or more computer processors, may be configured to perform that which is described in particular embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Although exemplary embodiments of the invention have been described in detail and in language specific to structural features and/or methodological acts above, it is to be understood that those skilled in the art will readily appreciate that many additional modifications are possible in the exemplary embodiments without materially departing from the novel teachings and advantages of the invention. Moreover, it is to be understood that the subject matter defined in the appended claims is not necessarily limited to the specific features or acts described above. Accordingly, these and all such modifications are intended to be included within the scope of this invention construed in breadth and scope in accordance with the appended claims.

What is claimed is:

1. A method of decoding video comprising:

(a) receiving a bitstream of encoded video coded based upon coding tree units of coding units where said bitstream includes a B-slice;

(b) decoding said bitstream of said encoded video;

(c) determining a rectangular coding unit that is coded using quantization, coded as a block of luma components and a block of chroma components, having a width and a height, where said width is different from said height, within said encoded bitstream, where said rectangular coding unit is not a prediction unit, and where said rectangular coding unit is not a transform unit;

(d) determining intensity information of pixels associated with a vertical boundary or a horizontal boundary of said rectangular coding unit along the height or along the width of said rectangular coding unit;

(e) applying deblocking filtering to said rectangular coding unit based at least in part on said intensity information associated with said rectangular coding unit, wherein said applied deblocking filtering is based upon filtering parameters β and tc specifying a boundary filtering that is selectively modified based upon an offset of quantization parameters where said offset is based at least in part on said determined intensity information of pixels associated with said boundary;

(f) wherein the greater said offset results in stronger filtering than would have occurred in an absence of such a greater offset;

(g wherein said offset includes at least three different said offset of quantization parameters;

(h) wherein said deblocking filtering is further based upon clipping; and (i) wherein said clipping is based upon said quantization parameters.

2. A method of encoding video by an encoder comprising:

(a) providing a bitstream of encoded video coded based upon coding tree units of coding units where said bitstream includes a B-slice;

(b) encoding said bitstream;

(c) wherein said encoding is based upon determining a rectangular coding unit that is coded using quantization, coded as a block of luma components and a block of chroma components, having a width and a height, where said width is different from said height, within said encoded bitstream, where said rectangular coding unit is not a prediction unit, and where said rectangular coding unit is not a transform unit;

(d) wherein said encoding is based upon determining intensity information of pixels associated with a vertical boundary or a horizontal boundary of said rectangular coding unit along the height or along the width of said rectangular coding unit;

(e) wherein said encoding is based upon applying deblocking filtering to said rectangular coding unit based at least in part on said intensity information associated with said rectangular coding unit, wherein said applied deblocking filtering is based upon filtering parameters β and tc specifying a boundary filtering that is selectively modified based upon an offset of quantization parameters where said offset is based at least in part on said determined intensity information of pixels associated with said boundary;

(f) wherein said encoding is based upon wherein the greater said offset results in stronger filtering than would have occurred in an absence of such a greater offset;

(g) wherein said encoding is based upon said offset includes at least three different said offset of quantization parameters;

(h) wherein said encoding is based upon said deblocking filtering is further based upon clipping; and (i) wherein said encoding is based upon said clipping is based upon said quantization parameters.

\* \* \* \* \*